Figures 1, 2:
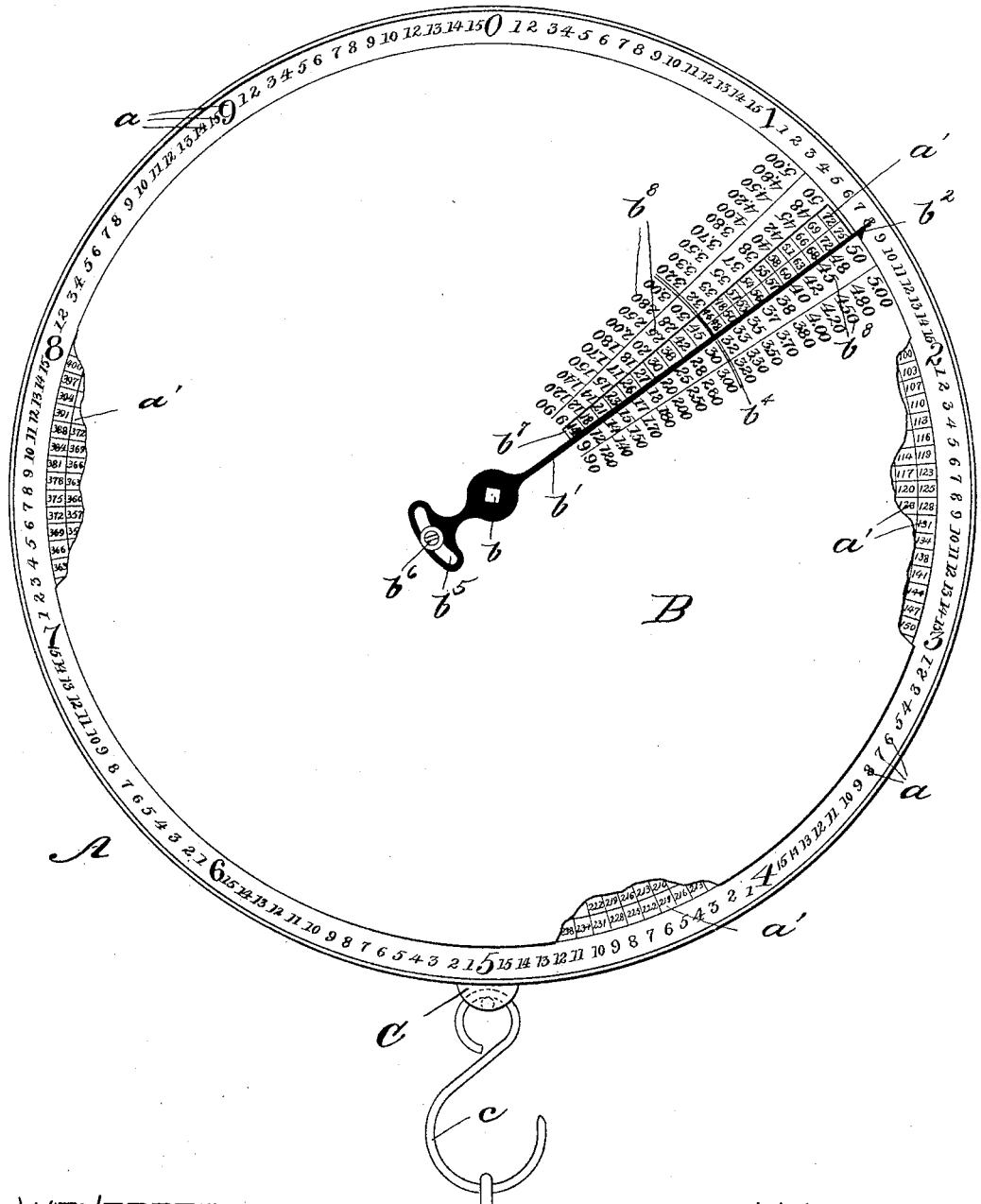

(No Model.)

A. W. CHURCHILL.
COMPUTING SCALE.

No. 596,052. Patented Dec. 28, 1897.

WITNESSES.
C. M. Sweeney

INVENTOR.
A. W. Churchill,
by Henry Calver
Atty.

THE NORRIS PETERS CO., PHOTO-LITHO., WASHINGTON, D. C.

UNITED STATES PATENT OFFICE.

ARTHUR W. CHURCHILL, OF EVERETT, MASSACHUSETTS.

COMPUTING-SCALE.

SPECIFICATION forming part of Letters Patent No. 596,052, dated December 28, 1897.

Application filed April 19, 1897. Serial No. 632,839. (No model.)

*To all whom it may concern:*

Be it known that I, ARTHUR W. CHURCHILL, a citizen of the United States, residing at Everett, in the county of Middlesex and State of Massachusetts, have invented certain new and useful Improvements in Computing-Scales, of which the following is a specification, reference being had therein to the accompanying drawings.

My invention relates to mechanical devices for computing and indicating total amounts and values and is adapted for use either in determining the value of articles sold by weight at a certain rate per pound or to aid in computing interest on different sums at various rates of interest for different periods of time.

In presenting my invention I have shown it as applied to a weighing device, and I have not thought it necessary to show or describe in detail its application to an interest computing and indicating apparatus, as the mechanism and disposition of parts are the same and its mechanical operation is identical in both adaptations of the invention, the only difference being in the indicating characters used in connection with the mechanism.

In the drawings illustrating my invention, Figure 1 is a face view of an ordinary spring-scale with my invention applied thereto. Fig. 2 is a detail view of an indicating pointer or hand which may be used.

In the detailed description which follows I shall not refer to the scale mechanism except in a general way, as it forms no part of the present invention and may be of any preferred form.

A indicates a fixed disk having an annular series of indicating marks or figures $a$ concentrically arranged near its outer edge, said marks in the drawings in the present case indicating pounds and ounces and showing a total of ten pounds. Within this outer row of indicating-marks $a$ on the face of the disk A are other radial concentric rows of indicating marks or figures $a'$, as clearly shown in Fig. 1, these figures $a'$ in the application of my invention, as shown, indicating the total value of goods of a certain weight at different prices per pound, as will be presently explained. A second disk B is mounted on the central arbor $b$ of the device, being fixed thereto so as to revolve with the arbor $b$ when the latter is turned by a pull on the bar or device C, connected with the weighing mechanism and which carries the suspending-hook $c$. Said revoluble disk B is provided with a radial slot $b^3$, through which the radially-disposed indicating characters $a'$ may be read as the disk B revolves under the weight or pull on the spring-scale. An indicator or pointer $b^2$, which is movable with the disk B, is provided, and said indicator or pointer may be formed integral with or marked on the disk B or made separate therefrom. In the form of indicator shown in Fig. 2 a slot $b^7$ is formed therein to register with the slot $b^3$ in disk B, provision being made in both of the forms shown for adjustment of the pointer relative to the slot $b^3$ in the revoluble disk B by providing it with the slotted tailpiece $b^5$ and the clamping-screw $b^6$. On either side of the slot $b^3$ are two rows of indicating marks or figures $b^8$, these figures in the present case indicating the price per pound of the various articles which are weighed. It will be seen that said figures $b^8$ are the same on both sides of the slot $b^7$, but are arranged in reverse order on the opposite sides of said slot, this arrangement enabling the attendant to read the various prices readily whatever the position of the disk B.

In the present case the arrangement of the figures is such that outside the double line $b^4$ (shown in Fig. 1) two radial rows of figures indicating total values are shown, and inside said double line a single radial row only of figures is shown, so that outside the said line the figures compute at one ounce, while inside they compute at two ounces. For example, if the indicator registered one pound seven ounces instead of one pound eight ounces, as shown, the total value could be determined for any price outside the double line $b^4$, as the radial divisions are finer outside said line $b^4$, as shown, while inside the said double line $b^4$ no totals are given for weights less than two ounces. I find that this disposition of the figures proves very convenient and satisfactory in weighing articles and computing their cost.

The operation of the device is as follows:

When a pull is exerted on the device C, the arbor $b$ is revolved and the disk B turns with it until the force of the pull is expended, when the dial comes to a state of rest with the pointer $b^2$ indicating the weight or pull on the scale in pounds and ounces on the outer row of figures $a$ on the fixed disk. In Fig. 1 the weight registered is one pound eight ounces. Assuming that the article sold costs fifty cents per pound, the total cost (seventy-five cents) will be seen through the slot $b^7$ adjacent to the price-per-pound figure, "$0.50," and in the same concentric division. If it is assumed that the movable disk and pointer have made one complete revolution, the total weight will be eleven pounds eight ounces, and the figures $b^8$ on the said disk adjacent to the figures indicating the price per pound will then be read in connection with or added to the figures on the fixed disk A, which are read through the slot $b^7$, and the total, "$5.75," will thus result.

In using the device for computing interest it will be obvious that the only change necessary would be in the characters used. Instead of a series of weight-indicating characters on the outer edge of the fixed disk A the edge of said disk would be divided into spaces denoting intervals of time. On either side of the slot $b^7$ would be placed the various rates of interest, while the concentric rows of figures which are read through the slot $b^7$ would be the total interest for the time indicated by the pointer $b^2$ at any given rate of interest.

From the foregoing it will be obvious that by the use of the device described computations can be easily and expeditiously made without any danger of errors or inaccuracies, which are liable to occur in making these computations in the ordinary laborious way.

Having thus described my invention, I claim and desire to secure by Letters Patent—

1. In a price-scale or computing device, the combination with the fixed disk A having an annular series of indicating characters $a$ at its outer edge and a series of radial concentric computations $a'$ on its face, said series of radial computations $a'$ being divided into two or more concentric divisions, as at $b^4$, as and for the purpose set forth, of a revoluble disk B slightly smaller than and pivoted to said fixed disk and having a radial slot $b^7$ formed therein and through which slot the computations $a'$ may be read, one or more rows of figures $b^8$ placed in reverse order on either side of said slot $b^7$ and an indicator or pointer $b^2$ movable with or carried by said disk B.

2. In a price-scale or computing device, the combination with a fixed disk having an annular series of indicating characters near its outer edge, and a series of radial, concentric rows of computations on its face, said series of radial computations being divided into two or more concentric divisions, of a revoluble disk slightly smaller than and pivoted to said fixed disk and provided with a radial slot through which the computations on said fixed disk may be read, two or more radial rows of figures placed in reverse order on either side of said radial slot, the outer rows of said figures giving totals for one or more revolutions of said pivoted disk, and an indicator or pointer movable with or carried by said revoluble disk.

In testimony whereof I affix my signature in presence of two witnesses.

ARTHUR W. CHURCHILL.

Witnesses:
 ALFRED W. BELL,
 W. A. WRANN.